United States Patent

Mason

[15] 3,686,351
[45] Aug. 22, 1972

[54] ALPHA-OLEFIN PRODUCTION
[72] Inventor: Ronald F. Mason, Mill Valley, Calif.
[73] Assignee: Shell Oil Company, New York, N.Y.
[22] Filed: July 16, 1971
[21] Appl. No.: 163,447

[52] U.S. Cl. .......260/683.15 D, 252/428, 252/429 B
[51] Int. Cl. .................................................C07c 3/10
[58] Field of Search.............260/683.15 D, 94.9 CB; 252/429 B, 428, 432

[56] References Cited

UNITED STATES PATENTS 3,131,155  4/1964  Luttinger...................252/428
3,558,736  1/1971  Bergem et al.........260/683.15

Primary Examiner—Paul M. Coughlan, Jr.
Attorney—Howard W. Haworth and Martin S. Baer

[57] ABSTRACT

Ethylene is oligomerized to linear, alpha-olefins by reacting ethylene in liquid phase solution in the presence of a catalyst composition produced by contacting in the presence of ethylene (1) a simple divalent nickel salt (2) a boron hydride reducing agent (3) a phosphinoacetic acid or alkali metal salt thereof.

10 Claims, No Drawings

ALPHA-OLEFIN PRODUCTION

BACKGROUND OF THE INVENTION

1. Field of the Invention

The present invention relates to the production of linear alpha-olefins which are compounds of established utility in a variety of applications. Such olefins, particularly $C_{12}$–$C_{20}$, are converted by treatment with sulfur trioxide, to alpha-olefin sulfonates, which are useful as biodegradable detergents. Alternatively, such olefins are converted to the corresponding alcohols as by conventional "Oxo" processes or sulfuric acid catalyzed hydration. The $C_{12}$–$C_{20}$ alcohols thus produced are ethoxylated with ethylene oxide in the presence of a basic catalyst, e.g., sodium hydroxide, to form conventional detergents and lower molecular weight alcohols are esterified with polyhydric acids, e.g., phthalic acid, to form plasticizers for polyvinyl chloride.

2. Description of Prior Art

Catalysts useful for the conversion of ethylene to linear alpha-olefins are known. For example, co-pending U.S. Ser. No. 874,377 of Keim et al., common assignee, filed Nov. 5, 1969, discloses a class of polymerization catalyst which comprises a nickel chelate produced by contacting a zero-valent nickel compound, e.g., bis-1,5-cyclooctadienenickel(0), and a phosphino-substituted carboxylic acid, e.g., diphenylphosphinoacetic acid. A related process of Singleton et al., copending U.S. Ser. No. 94,589, common assignee, filed Dec. 2, 1970, employs a catalyst composition produced by contacting a zero-valent nickel compound, e.g., bis-1,5-cyclooctadienenickel(0), and a dihydrocarbylphosphino-substituted benzoic acid, e.g., o-(methylphenylphosphino)benzoic acid. Although such catalysts are generally satisfactory, it would be of advantage to develop catalysts which do not require the use of thermally and oxidatively unstable and expensive catalyst precursors such as zero-valent nickel compounds.

Catalyst compositions produced by contacting a complex of a stable divalent nickel salt, e.g., bis(triphenylphosphine) nickel dichloride, and a hydridic reducing agent such as sodium borohydride, are disclosed by Luttinger, J. Org., Chem., 27, 1591 (1962). Although such catalyst compositions avoid the use of expensive and unstable zero-valent nickel compounds, they polymerize ethylene to high molecular weight polyethylene.

SUMMARY OF THE INVENTION

It has now been found that an improved process of oligomerizing ethylene to linear alpha-olefins is obtained by reacting ethylene in liquid phase solution in the presence of a catalyst composition produced by contacting in a polar organic solvent in the presence of ethylene (1) a simple divalent nickel salt (2) a boron hydride reducing agent (3) a phosphinoacetate ligand. The process is characterized by ethylene conversion to a linear alpha-olefin product mixture of relatively high proportion of olefinic products in the higher molecular range, e.g., $C_{12}$–$C_{20}$ alpha-olefins.

DESCRIPTION OF PREFERRED EMBODIMENTS

Nickel Salts

In general, any simple divalent nickel salt can be employed for preparing the catalyst composition of the invention provided the nickel salt is sufficiently soluble in the reaction medium. By the term "simple divalent" nickel salt is meant a nickel atom having a formal valence of +2 and bonded through ionic or electrovalent linkages to two singly charged anionic groups (e.g., halides or to one doubly charged anionic group (e.g., carbonate) and not complexed with or coordinated to any other additional molecular or ionic species. Simple divalent nickel salts therefore do not encompass complex divalent nickel salts which are bonded to one or two anionic groups and additionally complexed or coordinated to neutral chelating ligands or groups such as carbon monoxide and phosphines. However, simple divalent nickel salts are meant to include nickel salts containing water of crystallization in addition to one or two anionic groups.

In most instances, a simple divalent nickel salt with a solubility in the reaction diluent or solvent employed for catalyst preparation of at least 0.001 mole per liter (0.001M) is satisfactory for use as the nickel catalyst precursor. A solubility in the reaction diluent or solvent of at least 0.01 mole per liter (0.01M) is preferred, and a solubility of at least 0.05 mole per liter (0.05M) is most preferred. Reaction diluents and solvents suitably employed for catalyst preparation are the polar organic solvent suitably employed for the oligomerization process which solvents are defined below.

Suitable simple divalent nickel salts include inorganic as well as organic divalent nickel salts. Illustrative inorganic nickel salts are nickel halides such as nickel chloride, nickel bromide and nickel iodide, nickel carbonate, nickel chlorate, nickel ferrocyanide, and nickel nitrate. Illustrative organic divalent nickel salts are nickel salts of carboxylic acids such as nickel alkanoates of up to 10 carbon atoms, preferably of up to six carbon atoms, e.g., nickel formate, nickel acetate, nickel propionate, nickel hexanoate and the like; nickel oxalate; nickel benzoate and nickel naphthenate. Other suitable organic salts include nickel benzenesulfonate, nickel citrate, nickel dimethylglyoxime and nickel acetylacetonate.

Nickel halides, especially nickel chloride, and nickel alkanoates, in part because of their availability at low cost and solubility in polar organic solvents, are preferred nickel salts.

Phosphinoacetic Acid Ligand

The phosphinoacetate ligands employed in the preparation of the catalyst composition of the invention generally have from 12 to 30 carbon atoms, but preferably from 14 to 20 carbon atoms, and are represented by the formula (I): $R_2$—P—$CH_2$—COOM wherein R independently is a monovalent aromatic group or a cycloalkyl group and M is hydrogen or an alkali metal. Preferred M groups are sodium or potassium.

Suitable aromatic R groups have from six to 20 carbon atoms, preferably from six to 10 carbon atoms, and are hydrocarbyl aromatic groups containing only atoms of carbon and hydrogen or are substituted hydrocarbyl group containing, in addition to atoms of carbon and hydrogen other atoms such as oxygen, sulfur, nitrogen and halogen, particularly halogen of atomic number of from 9 to 53 inclusive, i.e., fluorine, chlorine, bromine or iodine, which additional atoms are present in functional groups such as alkoxy, aryloxy, carboalkoxy, alkanoyloxy, halo, trihalomethyl, cyano, sulfonylalkyl and like groups having no active hydrogen atoms.

Illustrative of suitable hydrocarbyl aromatic groups are phenyl, naphthyl, and alkaryl groups such as tolyl, xylyl, and p-ethylphenyl. Illustrative substituted-aromatic groups are p-methoxyphenyl, m-chlorophenyl, m-trifluoromethylphenyl, p-propoxyphenyl, p-cyanophenyl, o-acetoxyphenyl and m-methysulfonylphenyl. Preferred aromatic R groups are hydrocarbyl mononuclear aromatic groups of six to 10 carbon atoms.

Suitable cycloalkyl R groups have from five to 10 carbon atoms and include cycloalkyl groups such as cyclopentyl, cyclohexyl, 4-methylcyclohexyl, 2,4-dimethylcyclohexyl, and cycloheptyl. Preferred cycloalkyl groups have from 5 to 7 carbons, e.g., cyclopentyl and cyclohexyl.

Illustrative diarylphosphinoacetate ligands of formula I are diphenylphosphinoacetic acid, ditolylphosphinoacetic acid, dixylylphosphinoacetic acid, phenyl-p-ethylphenylphosphinoacetic acid, di-p-methoxyphosphinoacetic acid, di-p-cyanophosphinoacetic acid, di-o-acetoxyphosphinoacetic acid and the alkali metal salts thereof.

Illustrative dicycloalkylphosphinoacetate ligands of formula I are dicyclopentylphosphinoacetic acid, dicyclohexylphosphinoacetic acid, dicycloheptylphosphinoacetic acid and the alkali metal salts thereof. Illustrative arylcycloalkylphosphinoacetate ligands of formula I are phenylcyclohexylphosphinoacetic acid, xylycyclopentylphosphinoacetic acid, tolylcycloheptylphosphinoacetic acid and the alkali metal salts thereof.

Preferred phosphinoacetate ligands of formula I are those wherein the R groups are hydrocarbyl aromatic groups or cycloalkyl of five to six carbon atoms, and particularly preferred are diphenylphosphinoacetic acid, dicyclohexylphosphinoacetic acid and the alkali metal salts thereof.

Although the phosphinoacetic acid catalyst precursors are suitably employed as the free acid, better results are obtained with the alkali metal salts of the phosphinoacetic acid. The alkali metal salts are suitably preformed from the acetic acid by treatment with an alkali metal hydroxide or oxide solution prior to catalyst preparation or, alternatively, the carboxylic acid salt is generated in situ by the reaction of equimolar amounts of the carboxylic acid and an alkali metal hydroxide during catalyst preparation.

When preparing the catalyst, the molar ratio of nickel salt to acetate ligand (free acid or salt thereof) is at least 1:1, i.e., at least one mole nickel salt is provided for each mole of acetate ligand. Suitable molar ratios of nickel salt to acetate ligand (free acid or salt thereof) range from 1:1 to 5:1, although molar ratios of about 1.5:1 to 3:1 are preferred.

Boron Hydride Reducing Agent

In general, any boron hydride salt reducing agent of reasonable purity is suitable for use in the process of the invention. Specific examples include alkali metal borohydrides such as sodium borohydrides, potassium borohydride and lithium borohydride; alkali metal alkoxyborohydrides wherein each alkoxy has one to four carbon atoms, such as sodium trimethoxyborohydride and potassium tripropoxyborohydride and tetraalkylammonium borohydrides wherein each alkyl has one to four carbon atoms, such as tetraethylammonium borohydride. Largely because of commercial availability, alkali metal borohydrides are preferred and especially preferred is sodium borohydride.

When preparing the catalyst, the molar ratio of boron hydride salt to nickel salt is at least 1:1. There does not appear to be a definite upper limit on the boron hydride/nickel ratio, but for economic reasons it is especially preferred that the molar ratio be not greater than 15:1. The preferred molar ratio of boron hydride to nickel salt is usually between about 1:1 and about 10:1. Best results are often obtained when the molar ratio is about 2:1.

Catalyst Preparation

The catalyst composition of the present invention is suitably preformed by contacting the catalyst precursors, i.e., the nickel salt, the acetate ligand and the boron hydride reducing agent, in a polar organic diluent or solvent, e.g., polar organic diluents or solvents employed for the oligomerization process which are not reduced by the boron hydride reducing agent. In a preferred modification, the solvent, the nickel salt and the acetate ligand are contacted in the presence of ethylene before the addition of the boron hydride reducing agent. In order to obtain the improved catalyst of the invention it is essential that the catalyst composition is prepared in the presence of the ethylene reactant. Generally, the catalyst components are contacted under 10 to 1,500 psig of ethylene.

By any modification, the catalyst is generally prepared at temperatures of about 0° to 50° C., although substantially ambient temperatures, e.g., 10°–30 C., are preferred. Contact times of about 5 minutes to 1 hour are generally satisfactory.

Reaction Conditions

The ethylene is contacted with the catalyst composition in the liquid phase in the presence of a reaction solvent or diluent which is liquid at reaction temperature. Amounts of diluent or solvent of up to about 30 liters per mole of ethylene are satisfactorily employed. Generally, the concentration of the catalyst, calculated as nickel metal, in the solvent or diluent is at least 0.001M, but preferably from about 0.01M to 0.05M.

Suitable solvents or diluents are non-polar organic solvents such as aliphatic hydrocarbons, e.g., alkanes, including cycloalkanes of from five to 20 carbon atoms, such as cyclopentane, cyclohexane, isohexane, heptene, isooctane, decane, and eicosane; halo-alkanes, e.g., ethylene dichloride, hexachloroethane, 1,4-dichlorobutane; halocyclo-alkanes, e.g., chlorocyclohexane; aromatic compounds such as benzene, toluene and xylene; and haloaromatics such as chlorobenzene and hexafluorobenzene.

Other suitable solvents or diluents are polar organic compounds containing atoms such as oxygen, sulfur, nitrogen and phosphorus incorporated in functional groups such as hydroxy, alkoxy, aryloxy, carbalkoxy, alkanoyloxy, cyano, amino, alkylamino, dialkylamine, amide, N-alkylamide, N,N-dialkylamide, sulfonylalkyl and like functional groups. Illustrative oxygenated organic solvents are fully esterified polyacyl esters of polyhydroxy alkanes such as glycerol triacetate, tetraacyl esters of erythritol, diethylene glycol diacetate; monoesters such as ethyl acetate, butyl propionate and phenyl acetate; cycloalkyl ethers, e.g., dioxane, tetrahydrofuran, and tetrahydropyran; acyclic alkyl ethers, e.g., dimethoxyethane, diethylene glycol dimethyl ether and dibutyl ether; aromatic ethers such as anisole, 1,4-dimethoxybenzene and p-methoxytoluene; aliphatic alcohols such as methanol, trifluoroethanol, hexafluoroethanol, trifluoropropanol, sec-butanol, perfluorobutanol, octanol, dodecanol, cycloalkanols, e.g., cyclopentanol, and cyclohexanol; polyhydric acyclic hydroxyalkanes such as glycerol and trimethylene glycol, alkanediols of two to 10 carbon atoms such as ethylene glycol, propylene glycol, 1,4-butanediol and 2,5-hexanediol; phenols, such as cresol, p-chlorophenol, m-bromophenol, 2,6-dimethylphenol, p-methoxyphenol, 2,4-dichlorophenol; and alkylene carbonates such as ethylene carbonate, propylene carbonate and butylene carbonate. Illustrative nitrogen-containing organic solvents are nitriles, e.g., acetonitrile and propionitrile; amines, e.g., butylamine, dibutylamine, trihexylamine, N-methylpyrolidine, N-methylpiperidine, and aniline; N,N-dialkylamides, e.g., N,N-dimethylformamide and N,N-dimethylacetamine. Illustrative sulfur-containing solvents are sulfolane and dimethylsulfoxide and illustrative phosphorus-containing solvents are trialkylphosphates, e.g., trimethylphosphate, triethylphosphate and tributylphosphate and hexaalkylphosphoramides such as hexamethylphosphoramide.

Preferred reaction diluents and solvents are polar organic solvents, particularly oxygenated organic solvents. Especially preferred are alkanediols of four to six carbon atoms, e.g. 1,4-butanediol and 2,5-hexanediol.

Polar organic solvents and diluents are preferred for use in the process in part because the ethylene oligomerization product mixture is essentially insoluble in such solvents and diluents. For example, when a polar organic solvent such as an alkanediol is employed, a two phase reaction mixture is formed, i.e., one phase comprising the ethylene oligomerization product mixture, i.e., the alpha-olefins, and a second phase comprising the nickel catalyst and the reaction diluent or solvent. Where a two phase reaction is formed, the ethylene oligomerization product phase is separated and the catalyst containing diluent or solvent phase is utilized for further ethylene oligomerization. Polar organic solvents are also preferred in part because the same solvents are employed in catalyst preparation as previously indicated.

The precise method of establishing ethylene/catalyst contact during the oligomerization reaction is not critical. In one modification, the catalyst composition and the solvent are charged to an autoclave or similar pressure reactor, the ethylene is introduced, and the reaction mixture is maintained with agitation at reaction temperature and pressure for the desired reaction period. In the modification wherein a polar organic solvent is employed and a two phase reaction is formed, ethylene is passed in a continuous manner into a reaction zone containing the catalyst composition and the diluent while ethylene oligomerization product mixture which is produced is concomitantly withdrawn from the reaction zone.

By any modification, the oligomerization process is conducted at moderate temperatures and pressures. Suitable reaction temperatures vary from about 25° to 150° C., but preferably from about 50° to 90° C. The reaction is conducted at or above atmosphere pressure. The precise pressure is not critical so long as the reaction mixture is maintained substantially in a liquid phase. Typical pressures vary from about 10 psig to 5,000 psig with the range from about 400 psig to 1,500 psig being preferred.

The oligomerization products are separated and recovered from the reaction mixture by conventional methods such as fractional distillation, selective extraction, adsorption and the like. The reaction solvent, catalyst and any unreacted ethylene are recycled for further utilization. Spent catalyst, i.e., catalyst no longer active for ethylene oligomerization, is regenerated by reacting with additional boron hydride reducing agent and nickel salt in the molar ratios (based on acetate ligand) hereinbefore defined. No additional acetate ligand is required to regenerate the spent catalyst.

ILLUSTRATIVE EMBODIMENTS 1–5

A series of ethylene oligomerization reactions was conducted with a nickel catalyst prepared by reacting nickel chloride hexahydrate ($NiCl_2.6H_2O$), potassium salt of diphenylphosphinoacetic acid and sodium borohydride in a reaction medium of 1,4-butanediol and ethylene. Each reaction was conducted by charging 0.25 millimoles $NiCl_2.6H_2O$, 0.0083–0.25 millimoles potassium salt of diphenylphosphinoacetic acid, 65 ml 1,4-butanediol and 500 psig of ethylene to a 300 ml Magnedrive autoclave. After the autoclave was maintained at 25° C. for 15 minutes, 0.375–0.625 millimoles of sodium borohydride (0.5 molar solution in N,N-dimethylacetamide) and an additional 250 psig of ethylene (total ethylene pressure of 750 psig) were charged to the autoclave. The autoclave was maintained at 25° C, for 15 minutes and then heated to 75° C, and maintained at a pressure of 750 psig by continual addition of ethylene until ethylene uptake ceased. The molar ratio of nickel chloride to acetate ligand (potassium salt), the molar ratio of sodium borohydride to nickel chloride, the rate of oligomer formation (measured over the first 75 minutes), total grams of oligomers produced per gram of nickel, and the percent oligomer products in the $C_{12}$–$C_{20}$ carbon range are provided in Table I as Runs 1–5.

Gas liquid chromatographic analysis of the $C_{12}$ fraction of the oligomers produced in Runs 1–5 showed that the $C_{12}$ olefins consisted of about 94% wt linear α-olefins, about 4% wt linear internal olefins and about 2% wt branched olefins.

ILLUSTRATIVE EMBODIMENT 6

Illustrative embodiment 2 was repeated, except that the catalyst was prepared from diphenylphosphinoacetic acid instead of the potassium salt of diphenylphosphinoacetic acid. The rate of oligomer formation was 1,350 grams oligomers per gram nickel per hour and a total of 2,050 grams of oligomers were formed before the catalyst became inactive. The oligomer products consisted of 9.5% wt $C_{12}$–$C_{20}$ oligomers. The results are tabulated in Table I as Run 6.

ILLUSTRATIVE EMBODIMENT 7

Illustrative embodiment 2 was repeated except that the catalyst was prepared from nickel acetate tetrahydrate instead of nickel chloride. Oligomers were formed at a rate of 2,100 grams per gram nickel per hour (over first 75 minutes). A total of more than 7,650 grams of oligomers (10.8% wt in $C_{12}$–$C_{20}$ range) was formed. The results are tabulated in Table I as Run 7.

ILLUSTRATIVE EMBODIMENT 8

Illustrative embodiment 2 was repeated except that the catalyst was prepared from nickel nitrate ($Ni(NO_3)_2 \cdot 6H_2O$) instead of nickel chloride. Oligomers were formed at a rate of 950 grams per gram nickel per hour (over first 75 minutes). A total of 8,150 grams of oligomers (15.7% wt in $C_{12}$–$C_{20}$ range) was formed. The results are tabulated in Table I as Run 8.

ILLUSTRATIVE EMBODIMENT 9

Illustrative embodiment 1 was repeated except that the catalyst was prepared from the potassium salt of dicyclohexylphosphinoacetic acid instead of the potassium salt of diphenylphosphinoacetic acid and that the reaction temperature was 120° C. Oligomers were produced at a rate of 545 grams per gram of nickel per hour and a total of 6,500 grams of oligomer (19% wt in $C_{12}$–$C_{20}$ range) was formed.

ILLUSTRATIVE EMBODIMENT 10

Illustrative embodiment 1 was repeated except that ethylene was not added until after the nickel chloride, potassium salt of diphenylphosphinoacetic acid and sodium borohydride had been contacted. A total of 420 grams of oligomers (0.05% wt in $C_{12}$–$C_{20}$ range) was formed before the catalyst became inactive. The results are tabulated in Table I as Run 10.

ILLUSTRATIVE EMBODIMENT 11

Illustrative embodiment 2 was repeated except that the catalyst was prepared from the potassium salt of 2-(9-phosphabicycycol(3.3.1) nonyl)acetic acid instead of the potassium salt of diphenylphosphinoacetic acid. Oligomers were produced at a rate of 3,150 grams per gram of nickel per hour (measured over first 75 minutes) and a total of 9,000 grams of oligomer (94% wt 1-butene) was formed. The results are tabulated in Table I as Run 11.

ILLUSTRATIVE EMBODIMENT 12

A mixture of 0.65g (5 mmoles) anhydrous nickel chloride and 2.44g (10 mmoles) of diphenylphosphinoacetic acid were boiled under reflux in 70 ml of ethanol for 1 ½ hours during which time the nickel chloride gradually passed into solution. The mixture was filtered and evaporated to dryness. The resulting residue was crystallized from isopropanol to give bis-(diphenylphosphinoacetic acid)-dichloronickel as lustrous purple plates, m.p. 115°–116° C.

A mixture of 0.25 millimoles of the above nickel complex, 14 ml of 1,4-butanediol and 750 psig of ethylene was charged to an autoclave. After the autoclave was maintained at 25° C, for 15 minutes, 0.5 millimoles of sodium borohydride (0.5 molar in N,N-dimethylacetamide) was charged to the autoclave. The autoclave was maintained at 25° C, for 15 minutes and then heated to 75° C, and maintained at a pressure of 750 psig by continual addition of ethylene until ethylene uptake ceased. The rate of oligomer formation was 1,350 grams of oligomers per gram nickel per hour and a total of 3,300 grams of oligomers were formed before the catalyst became inactive. The oligomer products consisted of essentially 100 percent butenes. The results are tabulated in Table I as Run 12.

ILLUSTRATIVE EMBODIMENT 13

A solution of 4.9g (20 mmoles) diphenylphosphinoacetic acid in 20 ml ethanol was neutralized with 10 percent aqueous caustic soda. The resulting solution was added to a stirred solution of 2.4g (10 mmoles) of $NiCl_2 \cdot 6H_2O$ in 75 ml water. A precipitate of nickel bis-diphenylphosphinoacetate formed immediately. Crystallization of the nickel bis-diphenylphosphinoacetate from butanol gave blue-green crystals of pure diphenylphosphinoacetate, m.p. 200°–210° C, (decomp.).

By a procedure identical to illustrative embodiment 12, the nickel complex prepared above was reduced with sodium borohydride and employed as i catalyst for the oligomerization of ethylene. The rate of oligomer formation was 1,025 grams oligomers per gram nickel per hour and a total of 3,250 grams of oligomers were formed before the catalyst became inactive. The oligomer products consisted of 96% wt butenes. The results are tabulated in Table I as Run 13.

TABLE I

| Run | Nickel salt or complex | Ligand $\phi$-phenyl | Ratio Ni/ligand (moles) | Ratio $NaBH_4$/Ni (moles) | Gram oligomer/ gram Ni/hour | Gram oligomer/ gram Ni | Yield weight percent $C_4$ | $C_6$–$C_{10}$ | $C_{12-20}$ |
|---|---|---|---|---|---|---|---|---|---|
| 1 | $NiCl_2$ | $\phi_2PCH_2COOK$ | 1 | 2 | 2,350 | 9,700 | 45 | 48 | 6.3 |
| 2 | $NiCl_2$ | $\phi_2PCH_2COOK$ | 2 | 2 | 1,200 | 9,600 | 28 | 51.5 | 19.2 |
| 3 | $NiCl_2$ | $\phi_2PCH_2COOK$ | 3 | 2 | 1,050 | 7,600 | 25 | 52 | 20.7 |
| 4 | $NiCl_2$ | $\phi_2PCH_2COOK$ | 2 | 1.5 | 1,300 | 2,250 | 34 | 54 | 10.4 |
| 5 | $NiCl_2$ | $\phi_2PCH_2COOK$ | 2 | 2.5 | 1,000 | 8,950 | 20 | 52 | 17.2 |
| 6 | $NiCl_2$ | $\phi_2PCH_2COOH$ | 2 | 2 | 1,350 | 2,050 | 39 | 51 | 9.5 |
| 7 | $Ni(-OCCCH_3)_2$ | $\phi_2PCH_2COOH$ | 2 | 2 | 1,850 | 7,560 | 34 | 53 | 10.8 |
| 8 | $Ni(NO_3)_2$ | $\phi_2PCH_2COOK$ | 2 | 2 | 950 | 8,150 | 30 | 54 | 15.7 |
| 9 | $NiCl_2$ | $(C_6H_{11})_2PCH_2COOK$ | 2 | 2 | 545 | 6,500 | 1.8 | 8.8 | 19.1 |
| 10 | $NiCl_2$ | $\phi_2PCH_2COOK$ | 1 | 2 | | 420 | 80 | 20 | 0.5 |
| 11 | $NiCl_2$ | ⟨P⟩–$CH_2COOK$ | 2 | 2 | 3,150 | 9,000 | 94 | 4 | 0.1 |
| 12 | $NiCl_2 = 2\phi_2PCH_2COOH$ | | 2 | 2 | 1,350 | 3,300 | 100 | 0.1 | 0 |
| 13 | $Ni(-OCCH_2P\phi)_2$ | | 2 | 2 | 1,025 | 3,250 | 96 | 4 | 0.1 |

ILLUSTRATIVE EMBODIMENTS 14–19

A series of ethylene oligomerization reactions was conducted with a nickel catalyst prepared by reacting nickel chloride, potassium salt of diphenylphosphinoacetic acid and sodium borohydride in a variety of polar organic solvents. Each reaction was conducted by charging 0.25 millimoles of $NiCl_2 \cdot 6H_2O$, 0.125 millimoles of the potassium salt of diphenylphosphinoacetic acid, 65 ml of the indicated solvent or solvent mixture and 500 psig of ethylene to a 300 Magnedrive autoclave. The autoclave was then charged with 0.5 millimoles of sodium borohydride (as a 0.5 molar solution in N,N-dimethylacetamide) and sufficient ethylene to bring the pressure to 750 psig. The autoclave was maintained at 25° C, for 15 minutes and then heated to 75° C, and maintained at a pressure at 750 psig by the continual addition of ethylene until ethylene uptake ceased. The solvent employed, the rate of oligomer formation (measured over the first 75 minutes), the total amount of oligomers produced and the percentage of oligomers in the $C_{12}$–$C_{20}$ range are provided in Table II.

ILLUSTRATIVE EMBODIMENT 20

Illustrative embodiment 2 was repeated, except that the boron hydride reducing agent was employed sodium trimethoxyborohydride (ALFA) instead of sodium borohydride. Oligomers were produced at a rate of 650 grams per gram of nickel per hour (measured over the first 75 minutes) and a total of 4,150 grams of oligomers (12.4% wt in $C_{12}$–$C_{20}$ range) was formed before the catalyst became inactive.

TABLE II

| Run | Solvent | Gram oligomer/ gram ni /hour | Gram oligomer /gram ni | Yield,%wt $C_4$ | $C_6$–$C_{10}$ | $C_{12}$–$C_{20}$ |
|---|---|---|---|---|---|---|
| 14 | 1,4-Butanediol | 1000 | 11450 | 26 | 51 | 20.6 |
| 15 | 1,5-Pentanediol | 1770 | 2850 | 23 | 48 | 22.5 |
| 16 | 2,5-Hexanediol | 615 | 4450 | 27 | 50 | 20.3 |
| 17 | 50%v 1,4-Butanediol 50% v 2,5-Hexanediol | 1450 | 8450 | 23 | 51 | 21.9 |
| 18 | 80% v Propylene Carbonate 20% v 1,4-Butanediol | 580 | 9300 | (a) | 35 | 32.9 |
| 19 | 90% v Sulfolane 10% v 1,4-Butanediol | 785 | 5400 | (a) | 50 | 40.0 |

(a) Not determined.

I claim as my invention

1. A process of oligomerizing ethylene to linear, alpha-olefins by reacting ethylene in liquid phase solution at a temperature of about 25° to 150° C. in the presence of a catalyst composition produced by contacting in a polar organic solvent in the presence of ethylene (1) a simple divalent nickel salt having a solubility of at least 0.001 mole per liter in said polar organic solvent (2) a boron hydride reducing agent and (3) a phosphinoacetate ligand represented by the formula $R_2PCH_2COOM$ wherein M is hydrogen or alkali metal and R independently is an aromatic group of from six to 20 carbon atoms or cycloalkyl group of from five to 10 carbon atoms, the molar ratio of nickel salt to ligand being from about 1:1 to 5:1.

2. The process of claim 1 wherein the catalyst composition is produced in the presence of about 10 psig to 1,500 psig of ethylene at a temperature of about 0° to 50° C.

3. The process of claim 2 wherein the nickel salt has a solubility of at least 0.01 mole per liter in said polar organic solvent.

4. The process of claim 2 wherein the ethylene oligomerization reaction is conducted in the same polar organic solvent employed for catalyst preparation.

5. The process of claim 4 wherein boron hydride reducing agent is an alkali metal borohydride, the molar ratio of alkali metal borohydride to nickel salt is about 1:1 to 10:1 and M is hydrogen, sodium or potassium.

6. The process of claim 5 wherein the R group independently is a hydrocarbon aromatic group of six to 10 carbon atoms or a cycloalkyl group of from five to seven carbon atoms.

7. The process of claim 6 wherein the nickel salt is a nickel halide.

8. The process of claim 7 wherein the polar organic solvent is an alkanediol of four to six carbon atoms.

9. The process of claim 8 wherein the nickel halide is nickel chloride, R is phenyl, the boron hydride reducing agent is sodium borohydride and the polar organic solvent is 1,4-butanediol.

10. The process of claim 8 wherein the nickel halide is nickel chloride, R is cyclohexyl, the boron hydride reducing agent is sodium borohydride and the polar organic solvent is 1,4-butanediol.

* * * * *